Jan. 15, 1935.   W. B. MILLER   1,988,422
BRAZING ALLOY
Filed April 2, 1932
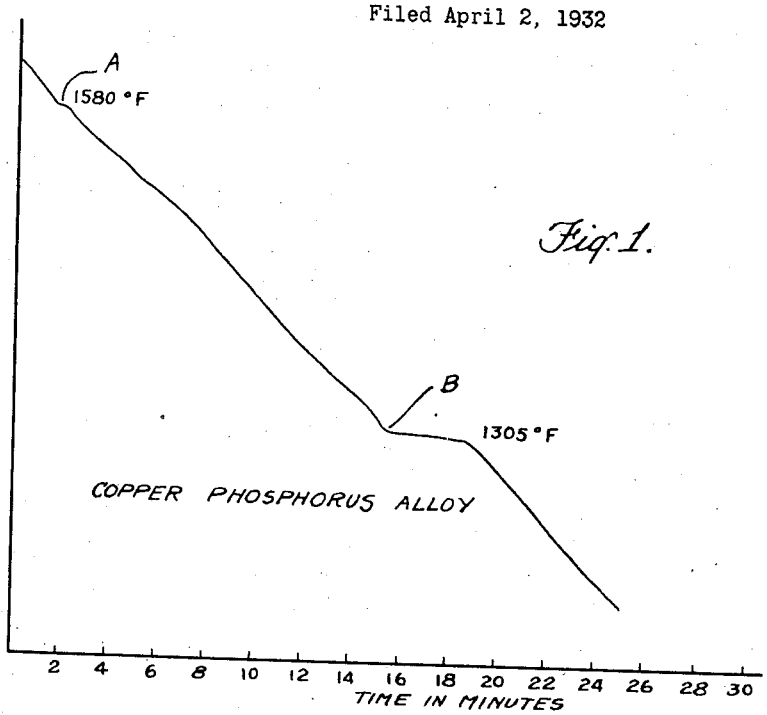
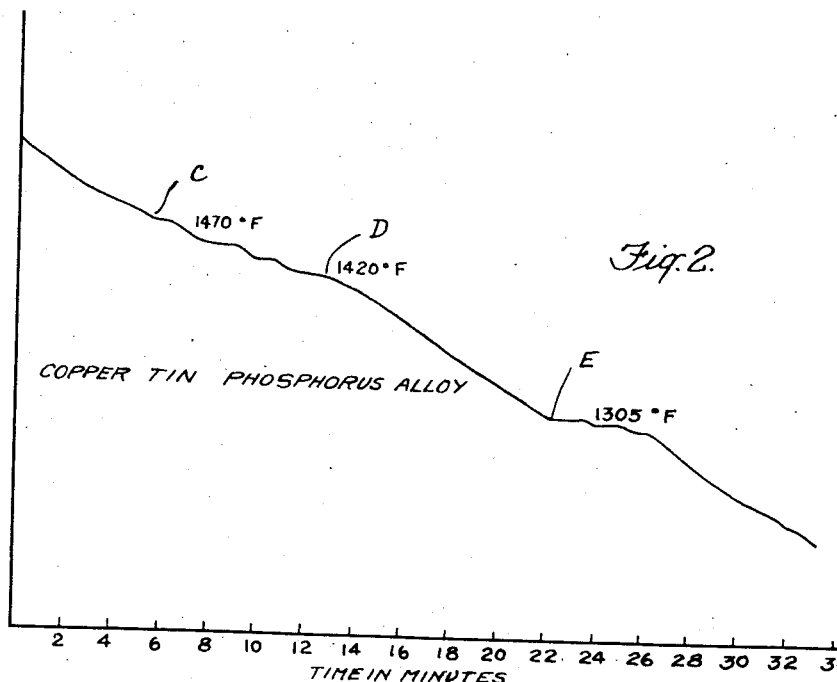
INVENTOR:
Wilber B. Miller,
BY Byrnes, Townsend & Potter,
ATTORNEYS.

Patented Jan. 15, 1935                                                    1,988,422

UNITED STATES PATENT OFFICE 1,988,422

BRAZING ALLOY

Wilber B. Miller, Flushing, N. Y., assignor to Oxweld Acetylene Company, a corporation of West Virginia Application April 2, 1932, Serial No. 602,776

8 Claims.  (Cl. 75—1)

This invention relates to an alloy used for welding and brazing and especially for brazing thin copper or brass articles in which a brazing material is required which shall be free flowing at as low temperature as possible.

It has been proposed to use alloys of copper and phosphorus for this purpose. Such an alloy is disclosed in U. S. Patent 1,652,107 to Eschholz. However, I have found that superior results can be obtained if tin is added to the copper-phosphorus welding rod or electrode.

An object of my invention is to provide an alloy and welding rod or electrode made therefrom which shall be free flowing at lower temperatures than alloys heretofore available. This and other objects of my invention will be evident from the following specification having reference to the accompanying drawing in which Fig. 1 is a freezing curve for an alloy containing 6.95% phosphorus with the balance principally copper, and;

Fig. 2 is a freezing curve for an alloy containing 6.98% phosphorus and 1.59% tin with the balance principally copper.

In welding or brazing brass or bronze articles, it is desirable that a free flowing, low melting alloy be used. The metal deposited must have sufficient strength and must not be brittle. In order to obtain these properties I have found it advantageous to use filler material consisting of an alloy containing phosphorus, tin and copper. The phosphorus should be between 4 and 7%, with the tin between 1 and 7%, the balance being principally copper, although silver may be added. I have tested rods containing up to 8% of silver in addition to the phosphorus and tin and have found, that although there is some improvement, this improvement is not commensurate with the cost. A composition consisting principally of copper with 6½ to 7% phosphorus and 1 to 3% of tin is of great commercial utility. If the phosphorus is reduced to 4 to 5%, the tin content should be substantially between 2 and 4%. An alloy consisting principally of copper with about 7% of phosphorus and about 2% of tin is especially suitable for work of this type.

The filler material for welding can be formed into rods or sheets. In case sheets are made they are cut into strips for welding purposes.

In Fig. 1 I show the freezing curve of an alloy consisting essentially of copper with 6.95% phosphorus. At A there is a break in the curve at about 1580° F. at which point copper starts to crystallize out. This crystallization continues until point B in the curve is reached. This point corresponds to a temperature of 1305° F. and at this point the melt consists of molten eutectic and copper crystals. On further cooling the eutectic freezes, the temperature remaining substantially constant until the melt is completely solidified. The eutectic consists of copper and copper phosphide.

In Fig. 2 I show the freezing curve for an alloy consisting essentially of copper with 6.98% phosphorus and 1.59% tin. Between points C, corresponding to 1470° F., and D, corresponding to 1420° F., the curve is somewhat broken coming to a decided arrest at about 1420° F., which I believe to be the solidification point of a ternary eutectic comprising copper, copper phosphide, and a copper tin compound. The copper tin compound is probably $Cu_3Sn$. From this point the alloy cools down to point E corresponding to 1305° F., the solidification point of the copper, copper phosphide eutectic. Thus it will be seen that the alloy containing tin is completely fluid at 1470° F. while the one containing only copper and phosphorus is pasty, due to the presence of copper crystals at 1580° F. This narrower freezing range gives an alloy which is more free flowing and requires less heat to penetrate into certain types of joints. A binary copper phosphorus alloy would require more phosphorus to attain the same fluidity. Tests of welds made with rods containing 6.95% phosphorus with the balance principally copper and with rods containing 6.98% phosphorus, 1.59% tin, with the balance principally copper are given in the following table. Rod X contained 6.95% phosphorus and rod Y contained 6.98% phosphorus and 1.59% tin.

| Joint | Material | Inches thickness | Rod | Ultimate strength lb./sq. in. | Failure |
|---|---|---|---|---|---|
| Butt | Brass | .028 | X | 34200 | Joint. |
| Do | do | .028 | Y | 59100 | do. |
| Lap | do | .122 | X | 36400 | do. |
| Do | do | .122 | Y | 41000 | do. |
| Butt | Copper | .062 | X | 18000 | do. |
| Do | do | .062 | Y | 28900 | do. |
| Do | do | .125 | X | 15400 | do. |
| Do | do | .125 | Y | 22850 | do. |

In all cases rod Y gave the better results. Lap joints in sheet brass were bent transversely to test the relative ductility of the two compositions and in all cases the joints made with rod Y withstood greater bending before cracking. The narrower melting range of rod Y allowed it to be deposited more smoothly on 60:40 brass without danger of melting the brass.

I am aware that it has been proposed to use alloys containing copper and phosphorus as a welding material. It has also been proposed to add small amounts of phosphorus to copper tin alloys, but in such cases the phosphorus has always been below 0.5%, in which case the alloys have a relatively high flowing point. It has also been proposed to use alloys of copper, phosphorus, tin and zinc but these have been brittle and not satisfactory for welding.

I claim:

1. Filler material for welding composed of an alloy consisting essentially of copper, from 4 to 7% of phosphorus and from 1 to 7% of tin.

2. Filler material for welding composed of an alloy consisting essentially of copper, from 4 to 7% of phosphorus and from 1 to 4% of tin.

3. Filler material for welding composed of an alloy consisting essentially of copper, phosphorus 4 to 5%, and tin 2 to 4%.

4. Filler material for welding composed of an alloy consisting essentially of copper, phosphorus 6 to 7%, and tin 1 to 3%.

5. Filler material for welding composed of an alloy consisting essentially of copper, phosphorus 6 to 7%, tin 1½ to 2%.

6. An alloy containing substantially 91% copper, substantially 7% phosphorus and substantially 2% tin.

7. An alloy composed of about 1 to 4% of Sn, about 4% of P, and the balance substantially Cu.

8. An alloy composed of from 4 to 7% of phosphorus, from 1 to 4% of tin, and the balance substantially copper.

WILBER B. MILLER.